(12) United States Patent
Page (10) Patent No.: US 10,016,696 B2
(45) Date of Patent: Jul. 10, 2018

(54) PAINT FRAME ADAPTED FOR DISASSEMBLY AND STORAGE

(71) Applicant: Charles B. Page, Cypress, TX (US)

(72) Inventor: Charles B. Page, Cypress, TX (US)

(*) Notice: Subject to any disclaimer, the term of this patent is extended or adjusted under 35 U.S.C. 154(b) by 0 days.

(21) Appl. No.: 15/158,734

(22) Filed: May 19, 2016

(65) Prior Publication Data

US 2017/0333805 A1 Nov. 23, 2017

(51) Int. Cl.
- *A47G 1/24* (2006.01)
- *A63J 1/02* (2006.01)
- *F16M 13/02* (2006.01)

(52) U.S. Cl.
CPC .............. *A63J 1/02* (2013.01); *F16M 13/027* (2013.01)

(58) Field of Classification Search
USPC ........................................................ 248/489
See application file for complete search history.

(56) References Cited

U.S. PATENT DOCUMENTS

| | | | | | |
|---|---|---|---|---|---|
| 1,042,284 | A | * | 10/1912 | Schenk | D06C 3/00 160/230 |
| 1,227,577 | A | * | 5/1917 | Brewer | E06B 9/52 160/374 |
| 1,443,923 | A | * | 1/1923 | Nercam | B44D 3/185 38/102.8 |
| 2,325,268 | A | * | 7/1943 | Nelson | D06F 59/08 38/102.1 |
| 3,098,611 | A | * | 7/1963 | Connell | G09F 13/00 160/374 |
| 3,448,551 | A | * | 6/1969 | Heller | E04C 2/08 160/374.1 |
| 3,529,653 | A | * | 9/1970 | Fey, Jr. | B44D 3/185 160/374.1 |
| 3,774,326 | A | * | 11/1973 | Selden | D04G 3/02 38/102.4 |
| 4,144,660 | A | * | 3/1979 | Lamb | B44D 3/185 160/378 |
| 4,179,830 | A | * | 12/1979 | Lamb | B44D 3/185 160/378 |
| 4,351,093 | A | * | 9/1982 | Scharf | D04D 7/02 28/149 |
| 4,446,968 | A | * | 5/1984 | Bremer | B44D 3/185 16/410 |
| 4,635,410 | A | * | 1/1987 | Chumbley | B44C 7/022 160/378 |
| 4,635,700 | A | * | 1/1987 | Berger | B44D 3/185 160/374.1 |

(Continued)

*Primary Examiner* — Monica E Millner
(74) *Attorney, Agent, or Firm* — Jeffrey L. Streets (57) ABSTRACT

A paint frame includes multiple frame segments, each frame segment having multiple frame branches, and each frame branch having a distal end releasably connected to the distal end of a frame branch of an adjacent frame segment, wherein the frame branches of the frame segments are connected to form a rectangular grid having a perimeter edge with a planar front surface. A kit for assembling the paint frame is also provided. The kit includes multiple frame segments, each frame segment having multiple frame branches, and each frame branch having a distal end releasably connectable to the distal end of a frame branch of an adjacent frame segment, wherein the frame branches of the frame segments are releasably connectable to form a rectangular grid having a perimeter edge with a planar front surface.

20 Claims, 9 Drawing Sheets

(56) References Cited

U.S. PATENT DOCUMENTS

| | | | | |
|---|---|---|---|---|
| 5,113,611 | A * | 5/1992 | Rosson | B41F 15/36 |
| | | | | 101/127.1 |
| 5,193,603 | A * | 3/1993 | Whisnant | A47G 5/00 |
| | | | | 160/135 |
| 5,414,950 | A * | 5/1995 | Johnson, Sr. | A01M 31/025 |
| | | | | 135/119 |
| 5,839,214 | A * | 11/1998 | Peterson | B44D 3/185 |
| | | | | 160/374.1 |
| 6,119,999 | A * | 9/2000 | Fleishman | A47G 1/1686 |
| | | | | 248/340 |
| 6,253,471 | B1 * | 7/2001 | Strauh | B44D 3/185 |
| | | | | 160/381 |
| 7,770,314 | B2 * | 8/2010 | Dean | G09F 15/0012 |
| | | | | 248/219.1 |
| 8,353,327 | B2 * | 1/2013 | Domingue | B44D 3/185 |
| | | | | 160/371 |
| 8,418,383 | B2 * | 4/2013 | Badawi | A47G 1/0616 |
| | | | | 160/377 |
| 8,453,362 | B2 * | 6/2013 | Cappelle | B44D 3/185 |
| | | | | 38/102.5 |
| 8,851,144 | B2 * | 10/2014 | Forbis | E04B 1/80 |
| | | | | 160/135 |
| 8,936,065 | B1 * | 1/2015 | Gillespie | B44D 3/185 |
| | | | | 160/371 |
| 9,623,700 | B2 * | 4/2017 | Schwed | B44D 3/185 |
| 9,738,108 | B2 * | 8/2017 | Ridless | B42D 15/0073 |
| 2002/0092244 | A1 * | 7/2002 | Santa Cruz | A63J 1/02 |
| | | | | 52/7 |
| 2009/0218470 | A1 * | 9/2009 | Zlotocha | A47G 1/16 |
| | | | | 248/478 |
| 2017/0265660 | A1 * | 9/2017 | Cappelle | A47G 1/08 |

* cited by examiner

PAINT FRAME ADAPTED FOR DISASSEMBLY AND STORAGE

BACKGROUND

Field of the Invention

The present invention relates to a paint frame for use in preparing a drop for a theater.

Background of the Related Art

A paint frame is a large rigid structure used in the preparation of theatrical scenery, such as a backdrop (or simply "drop"). Fabric is secured between the perimeter edges of the paint frame to facilitate preparation and painting of the fabric. For example, a large fabric drop may be stapled to a wood paint frame and then sized with a starch, paint, hot water, or other product in order to shrink the fabric, remove any wrinkles, and produce a consistent surface that is ready to accept paint. After sizing the fabric drop, the prepared surface may be cartooned and painted. If a fabric drop that has a large surface area, such as greater than 20 feet wide and 20 feet in height, it may be beneficial to paint the fabric drop in a vertical orientation. The vertical orientation makes it easier to access and paint the entire surface of the fabric drop, while also taking up less floor space in the theater.

Paint frames may be very large structures that are permanently installed in a space that has been designed to house them. Some facilities may have the ability to raise and lower a vertically oriented paint frame so that a painter can stand on the floor and reach the entire drop. In facilities without such an ability, it may be necessary to use a ladder or a mechanical lift in order for the painter to reach the upper portions of the drop. However, in either facility, the paint frame is a permanent installation that prevent a large wall space from being used for any other purpose.

BRIEF SUMMARY

One embodiment of the present invention provides a paint frame comprising a plurality of frame segments, each frame segment having a plurality of frame branches, and each frame branch of each frame segment having a distal end releasably connected to the distal end of one of the frame branches of an adjacent frame segment, wherein the frame branches of the plurality of frame segments are connected to form a rectangular grid having a perimeter edge with a planar front surface.

Another embodiment of the present invention provides a kit for assembling a paint frame, the kit comprising a plurality of frame segments, each frame segment having a plurality of frame branches, and each frame branch of each frame segment having a distal end releasably connectable to the distal end of one of the frame branches of an adjacent frame segment, wherein the frame branches of the plurality of frame segments are releasably connectable to form a rectangular grid having a perimeter edge with a planar front surface, and wherein the rectangular grid includes at least two rows of grid blocks and at least three columns of grid blocks.

BRIEF DESCRIPTION OF THE SEVERAL VIEWS OF THE DRAWINGS

FIG. 2A is a diagram of three frame segments having respective frame branches in axial alignment prior to forming a connection there between.

FIG. 3A is a front view of the aligned ends of two frame branches prior to forming a connection there between.

FIG. 3C is a top view of the aligned ends of the two frame branches shown in FIG. 3A prior to forming a connection there between.

FIG. 3D is a front view of the two frame branches shown in FIG. 3A after forming a connection there between.

FIG. 4 is a diagram of first and second frame subassemblies having respective pluralities of frame branches in alignment prior to forming a connection there between.

DETAILED DESCRIPTION

One embodiment of the present invention provides a paint frame comprising a plurality of frame segments, each frame segment having a plurality of frame branches, and each frame branch of each frame segment having a distal end releasably connected to the distal end of one of the frame branches of an adjacent frame segment, wherein the frame branches of the plurality of frame segments are connected to form a rectangular grid having a perimeter edge with a planar front surface.

According to various embodiments, each frame segment includes at least a first frame branch and a second frame branch that is perpendicular to the first frame branch. In a specific example, the plurality of frame segments includes corner segments, side segments and interior segments, wherein each of the corner segments have two frame branches, each of the side segments have three frame branches, and each of the interior segments have four frame branches. The rectangular grid preferably includes at least two rows of grid blocks and at least three columns of grid blocks.

In another embodiment of the paint frame, each of the frame branches are made with square metal tubing and preferably have the same diameter. The square metal tubing provides rigidity to the paint frame and a flat front surface that is suitable for securing wood boards. In one specific example of the paint frame, the frame branches that form the perimeter edge of the rectangular grid include a plurality of spaced apart holes extending through the frame branches from the planar front surface. The holes receive fasteners securing wood boards along the planar front surface, such that the wood boards form a rectangular frame to which fabric may be secured using staples. The fabric may be subsequently sized to form a drop that may be cartooned and painted. The removable fasteners used to connect two frame branches preferably extend through the frame branch and the single section of square metal tubing in a direction parallel to the planar front surface of the paint frame in order to avoid interference with either the wood boards or the fabric.

In a further embodiment, the distal ends of first and second connected frame branches receive and secure first and second opposing ends, respectively, of a single section of square metal tubing. In accordance with one option, the first opposing end of the single section of square metal tubing is welded into the distal end of the first connected frame branch, and the second opposing end of the single section of square metal tubing is releasably secured into the distal end of the second connected frame branch. For example, the second opposing end of the single section of square metal tubing may be releasably secured into the distal end of the second connected frame branch by securing a removable fastener in a first hole through the distal end of the second connected frame branch and a second hole through the second opposing end of the single section of square metal tubing. Without limitation, the removable fastener may be a bolt and nut. Each connection between two frame branches may be made in the same manner, although it does not matter which of the two frame branches is the first connected frame branch and which of the two frame branches is the second connected frame branch.

The single section of square metal tubing may facilitate the connection of two frame branches, and may also serve to align the two frame branches so that the two frame branches share an axial centerline. Accordingly, the second opposing end of the single section of square metal tubing preferably fits within the distal end of the second connected frame branch with a gap between the outside of the pin type connector and the inside of the socket type connector having an aspect ratio (the ratio of the gap length of the gap width) greater than ten. In a specific example, the second opposing end of the single section of square metal tubing may extend greater than 5 inches into the distal end of the second connected frame branch, and the gap may be less than ⅛ inch wide. A gap that is 5 inches long and ⅛ inch wide has an aspect ratio of 40 (i.e., 5 inches/0.125 inches=40).

In a still further embodiment, the distal ends of the first and second connected frame branches each form a shoulder that is perpendicular to an axial centerline of the frame branch. Accordingly, the shoulder of the first connected frame branch engages the shoulder of the second connected frame branch, such that the shoulders urge the first and second connected frame branches to align with a common axial centerline.

Additional hardware may be secured to the paint frame to allow suspension of the paint frame. For example, the rectangular grid is suspended from a fly system, and wherein the total weight of the plurality of frame segments in the rectangular grid is less than the maximum rated weight capacity of the fly system. Specifically, a pair of eye bolts may be secured to the upper edge of the rectangular grid, such that separate wire cables may have a first end looped through the eye bolts and a second end secured to a batten of the fly system. The wire cables are preferably equally spaced from the center of mass of the paint frame.

Another embodiment of the present invention provides a kit for assembling a paint frame, the kit comprising a plurality of frame segments, each frame segment having a plurality of frame branches, and each frame branch of each frame segment having a distal end releasably connectable to the distal end of one of the frame branches of an adjacent frame segment. The frame branches of the plurality of frame segments are releasably connectable to form a rectangular grid having a perimeter edge with a planar front surface. Preferably, the rectangular grid includes at least two rows of grid blocks and at least three columns of grid blocks.

In one embodiment of the kit, the plurality of frame segments includes corner segments, side segments and interior segments, wherein each of the corner segments have two frame branches, each of the side segments have three frame branches, and each of the interior segments have four frame branches. Optionally, each of the frame branches are made with square metal tubing having the same diameter. Furthermore, the frame branches may be made with rectangular metal tubing, preferably having the same cross-sectional dimensions for each frame branch. It should be understood that square or rectangular metal tubing is generally commercially available in various dimensions and having various wall thicknesses. Furthermore, the square or rectangular metal tubing used to make the frame branches may have rounded corners with a range of radii.

In a further embodiment of the kit, the distal ends of first and second releasably connectable frame branches are adapted to receive and secure first and second opposing ends of a single section of square metal tubing. In a specific option, the first opposing end of the single section of square metal tubing is welded into the distal end of the first frame branch, and wherein the second opposing end of the single section of square metal tubing is releasably securable into the distal end of the second frame branch using a fastener that is removably receivable in a first hole through the distal end of the second frame branch and a second hole through the second opposing end of the single section of square metal tubing. It should be recognized that embodiments of the kit may include any one or more aspect or feature of the paint frame, except that the components of the kit are not yet assembled into a rectangular grid. Furthermore, it should be recognized that the paint frame may be disassembled for storage or transportation to another location.

Figure 1:
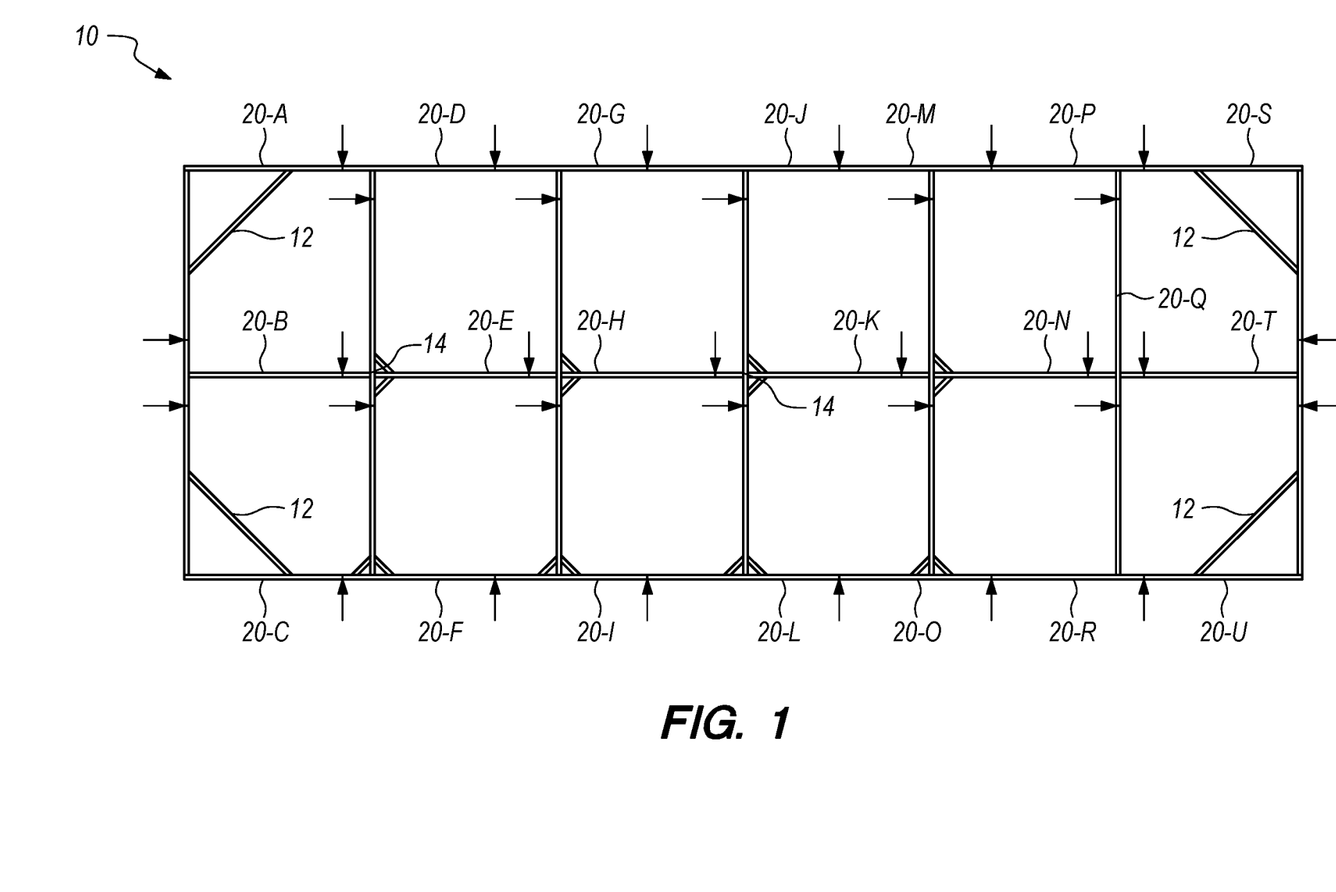
FIG. 1 is a plan view of a paint frame that has been assembled from a plurality of frame segments according to one embodiment of the present invention.

FIG. 1 is a plan view of a paint frame 10 that has been assembled from a plurality of frame segments (20-A through 20-U) according to one embodiment of the present invention. In this non-limiting example, there are 21 frame segments connected together forming a large grid with a rectangular perimeter (top, right, bottom and left edges). This particular grid includes grid blocks or squares forming two rows and six columns. A paint frame consistent with the present invention may have any other number of rows and columns.

Each of the frame segments (20-A through 20-U) has at least two frame branches or arms that terminate in a distal end that is connected to a frame branch of an adjacent frame segment. The illustrated paint frame 10 has 32 connections between the 21 frame segments, where each connection is indicated by an arrow. In particular, each of the four corner frame segments (20-A, 20-C, 20-S and 20-U) have two frame branches, each of the side frame segments (20-B, 20-D, 20-F, 20-G, 20-I, 20-J, 20-L, 20-M, 20-O, 20-P, 20-R, and 20-T) have three frame branches, and each of the internal frame segments (20-E, 20-H, 20-K, 20-N and 20-Q) have four frame branches.

Some or all of the frame segments may include one or more braces to increase the rigidity of the frame segment and maintain the angular orientation of the frame branches of the frame segment. Furthermore, the size of the braces may vary among the frame segments. For example, a rectangular paint frame may include four corner frame segments (20-A, 20-C, 20-S and 20-U) that each include a major brace 12 to maintain the two frame branches of each corner frame segment at a ninety-degree (90°) angle. These major braces assist the entire rectangular paint frame in retaining its shape and avoid sagging or shifting. For example, the major brace may be made using the same square metal tubing that is used to make the frame branches. Minor braces 14 may be made with a flat metal plate, preferably centered in the plane of the paint frame and extending at a 45 degree angle between two frame branches of the same frame segment.

The paint frame 10 may be installed in any space, such as a theater, and is preferably suspended from a fly system or in a fixed position from a ceiling. For example, a paint frame that is about 60 feet by 20 feet made with 1½ inch diameter square tubing may weigh about 650 pounds and may be stored in a space that is 9 feet wide, 9 feet high, and 4 feet deep. The ability to store the paint frame in a small space enables temporary installation of the paint frame as needed. Furthermore, the paint frame is rigid and may have a weight that is less than the maximum rated capacity of most fly systems that are available in some auditoriums.

The frame segments (20-A through 20-U) of the paint frame 10 in FIG. 1 may be assembled in any suitable order. However, since the frame segments are rigid and their assembly involves both lateral and vertical connections to be described below, it may be necessary to assemble the frame segments in sections and then assembly one section to another section. In one example, all of the frame segments within a row are assembled, and then each of the assembled rows of frame segments are connected together. In a similar example, all of the frame segments within a column are assembled, and then each of the assembled columns of frame segments are connected together. The latter example is illustrated in reference to the Figures below.

Figure 2A:
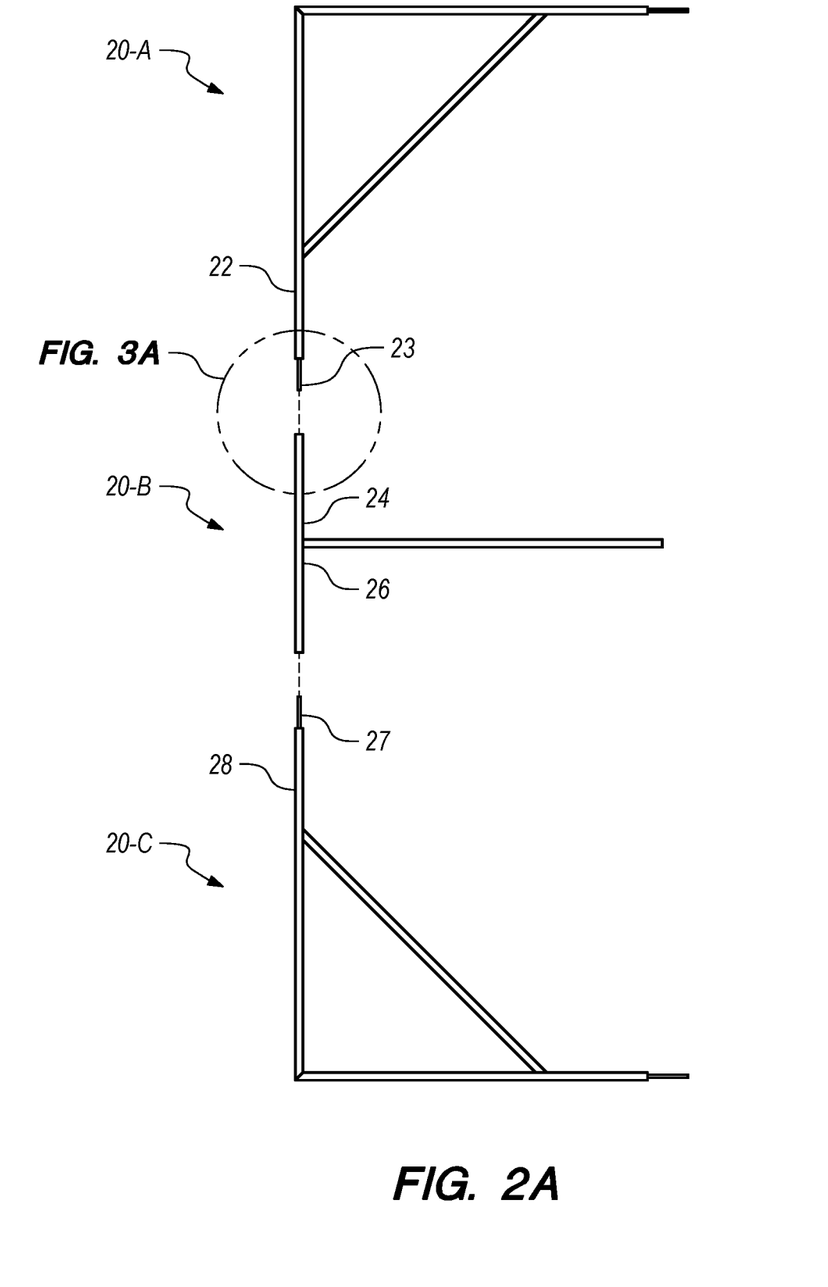

FIG. 2A is a diagram of three frame segments (20-A, 20-B, 20-C) having respective frame branches (22, 24, 26, 28) in axial alignment prior to forming a connection there between. Specifically, the upper left corner frame segment 20-A has a frame branch 22 aligned for connection with the frame branch 24 of a left side frame segment 20-B, and the lower left corner frame segment 20-C has a frame branch 28 aligned for connection with the frame branch 26 of the left side frame segment 20-B. The frame branch 22 has a square metal tubing section 23 extending from a distal end of the frame branch 22. The dimensions of the square metal tubing section 23 allow the section 23 to be received and secured within the square metal tubing of the frame branch 22 and the frame branch 24. Similarly, the frame branch 28 has a square metal tubing section 27 extending from a distal end of the frame branch 28.

Figure 2B:
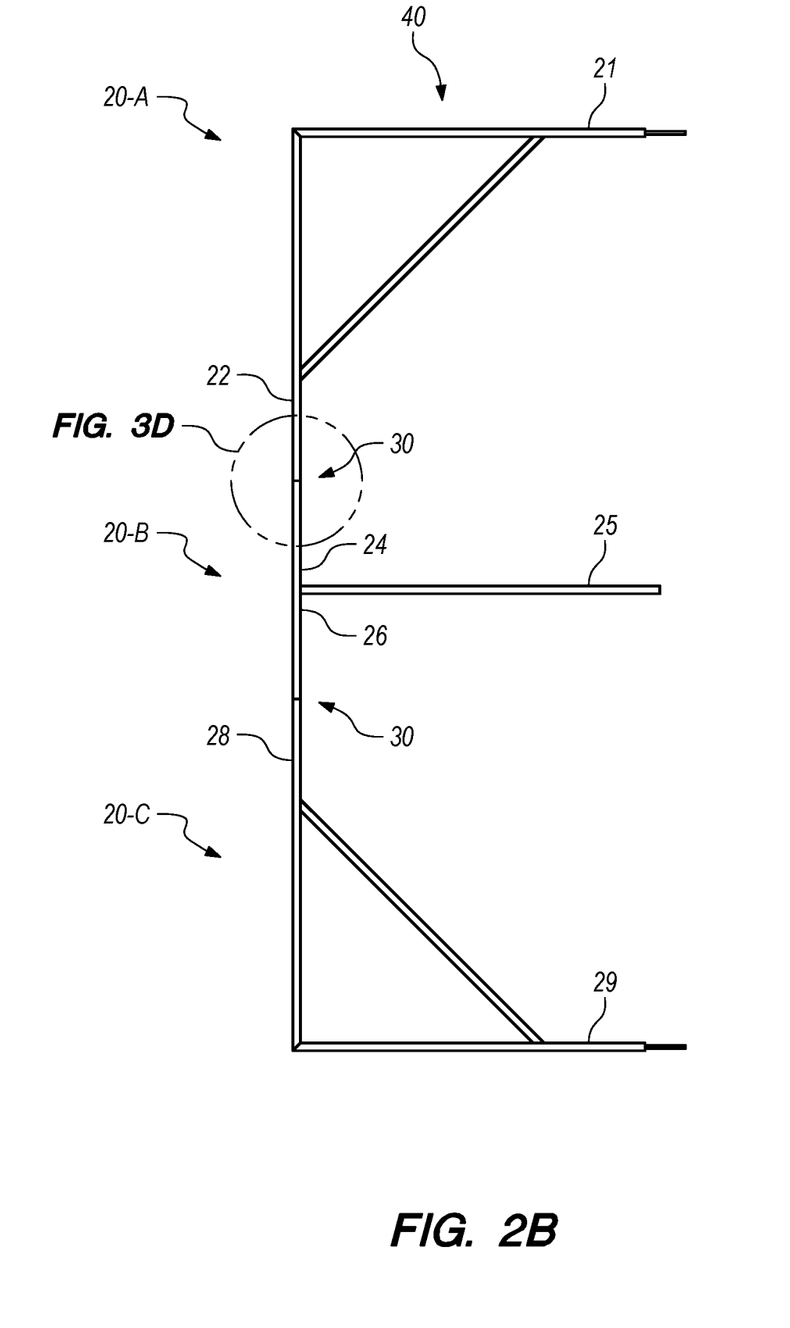
FIG. 2B is a diagram of the three frame segments after forming connections between the frame branches to form a frame subassembly.

FIG. 2B is a diagram of the three frame segments (20-A, 20-B, 20-C) after forming connections 30 between the upper pair of frame branches 22, 24 and between the lower pair of frame branches 26, 28 to form a first frame subassembly 40. Notice that to form the first frame subassembly 40, the three frame segments are moved together along the axial centerline of the frame branches being connected. As shown in FIG. 2A, the axial centerline is vertical. Also notice that the first frame subassembly 40 now has three unconnected frame branches 21, 25, 29 that are each laterally directed.

Figure 3A:
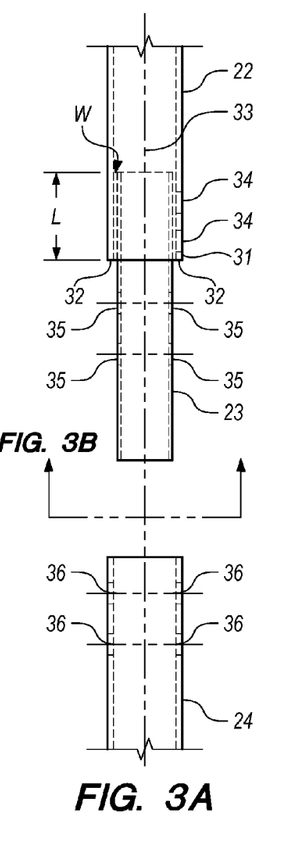

FIG. 3A is a front view of the aligned ends of the two frame branches 22, 24 as shown in FIG. 2A prior to forming a connection there between. The upper frame branch 22 has a distal end 31 forming a shoulder 32 that is perpendicular to the axial centerline 33. The square metal tubing section 23 is received within the distal end 31 to provide an overlap between the section 23 and the frame branch 22 of a desired length (L). The square metal tubing section 23 has dimensions that allow the section 23 to fit within the square metal tubing of the frame branch 22, but preferably with a gap of no more than a minimal width (W) between the outer surface of the section 23 and the inner surface of the frame branch 22. The gap may be characterized by an aspect ratio equal to the length (L) to the width (W).

As shown, a pair of holes 34 are formed through the wall of the frame branch 22 to expose the section 23, such that the section 23 can be welded to the frame branch 22. Accordingly, the section 23 may form a permanent extension from the frame branch 22, which reduces part count and assembly steps. The section 23 further includes a pair of holes 35 positioned to align with a pair of holes 36 through the adjacent frame branch 24 when the section 23 is fully inserted into the frame branch 24 (as shown in FIG. 3D).

Figure 3B:
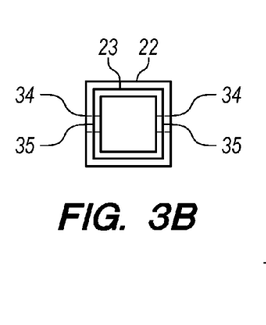
FIG. 3B is an end view of one of the frame branches, as indicated in FIG. 3A, illustrating the use of concentric square tubing.

FIG. 3B is an end view of one of the frame branch 22, as indicated in FIG. 3A, illustrating the use of concentric square tubing. As shown, the square metal tubing section 23 is nested within the frame branch 22. While no gap is shown in FIG. 3B, a small gap may be tolerated. The positions of the holes 34, 35 are also illustrated.

Figure 3C:
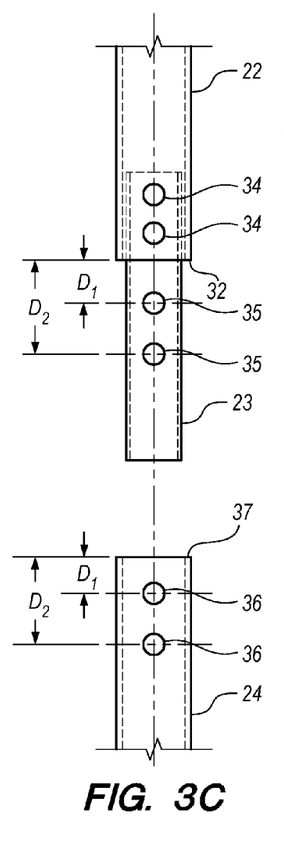

FIG. 3C is a top view of the aligned ends of the two frame branches shown in FIG. 3A prior to forming a connection there between. In other words, the frame branches 22, 24 shown in FIG. 3C have been rotated 90 degrees from the position shown in FIG. 3A in order to illustrate the holes 34 used to weld the section 23 in place, and the holes 35, 36 that are used to releasably secure the frame branches 22, 24 together. Note that the distance ($D_1$) to the first (upper) hole 35 in the section 23 is the same as the distance ($D_1$) to the first (upper) hole 36 in the distal end of the frame branch 24, and that the distance ($D_2$) to the second (lower) hole 35 in the section 23 is the same as the distance ($D_2$) to the second (lower) hole 36 in the distal end of the frame branch 24. Accordingly, when the section 23 is fully inserted into the lower frame branch 24, the shoulder 32 of the upper frame branch 22 engages the shoulder 37 of the lower frame branch 24 and the holes 35 in the section 23 align with the holes 36 in the lower frame branch 24.

Figure 3D:
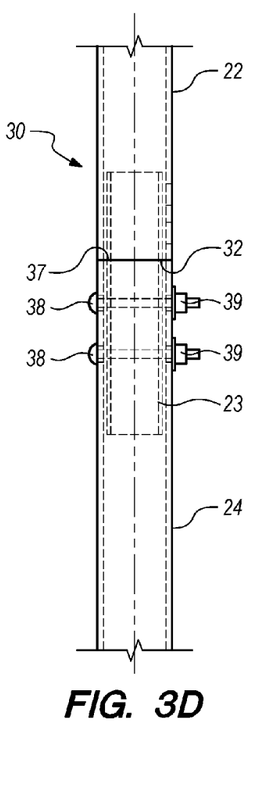

FIG. 3D is a front view of the two frame branches 22, 24 shown in FIG. 3A after forming a connection 30 there between. The shoulders 32, 37 are engaged and a pair of bolts 38 extend though the pair of aligned holes 35, 36. A nut 39 may be threaded onto each bolt 38 to secure the bolt in position. The two frame branches 22, 24 are securely connected in this manner until the bolts are removed. Although various connections between frame branches may be laterally-oriented or vertically-oriented, the connection 30 is representative of each connection within the paint frame.

Figure 4:
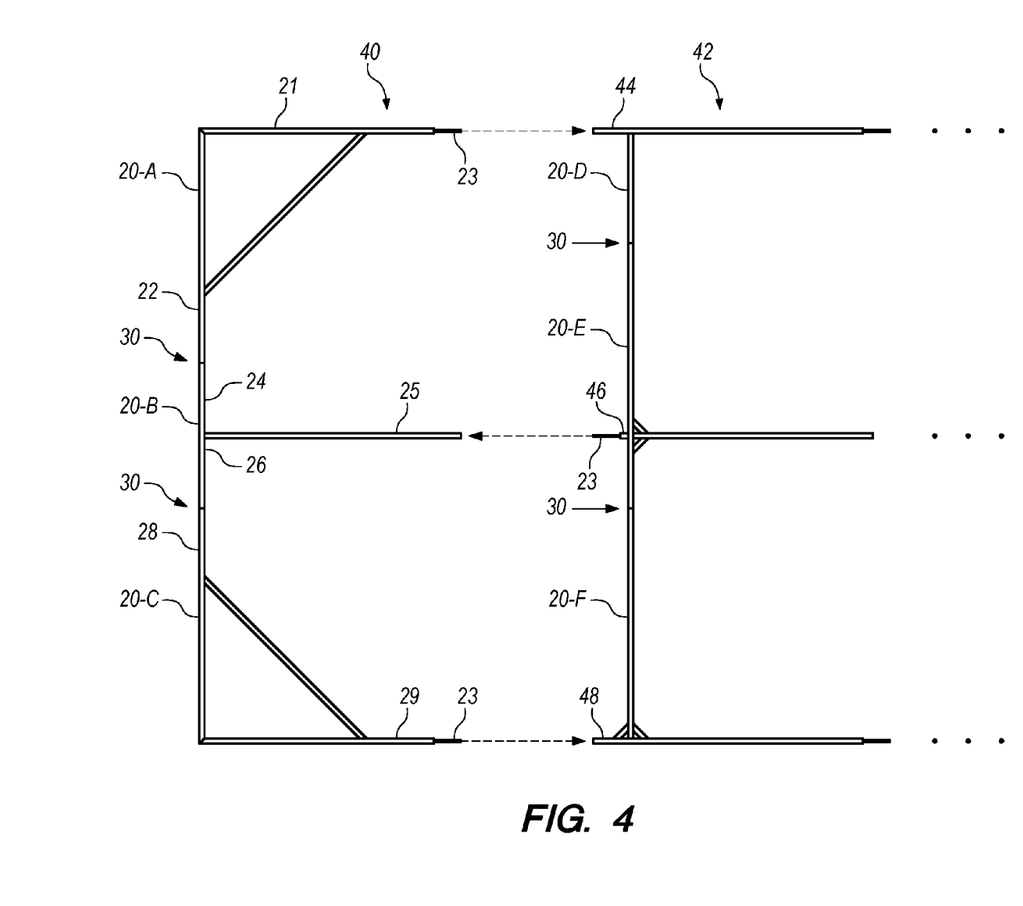

FIG. 4 is a diagram of first and second frame subassemblies 40, 42 having respective pluralities of frame branches in alignment prior to forming a connection there between. In this example, the first frame subassembly 40 has three frame segments (20-A, 20-B, 20-C) and two connections 30, and the second frame subassembly 42 has three frame segments (20-D, 20-E, 20-F) and two connections 30. However, the first frame subassembly 40 has three laterally-oriented frame branches 22, 25, 29 that are aligned for connecting with three laterally-oriented frame branches 44, 46, 48. Although each connection 30 uses only one square metal tubing section 23, it doesn't matter which of any two connecting frame branches secures the section 23. As shown, the frame branches 21, 29, 46 include the sections 23. The first frame subassembly 40 and the second frame subassembly 42 are moved together laterally to make up a first new connection between the upper frame branches 21, 24, a second new connection between the middle frame branches 25, 46, and a third new connection between the lower frame branches 29, 48. The entire paint frame 10 (see FIG. 1) may be assembled by first preparing each subassembly using vertically-oriented connections and then connecting each subassembly using laterally-oriented connections. Alternatively, subassemblies may be prepared using laterally-oriented connections, where the subassemblies are subsequently connected using vertically-oriented connections.

Figure 5:
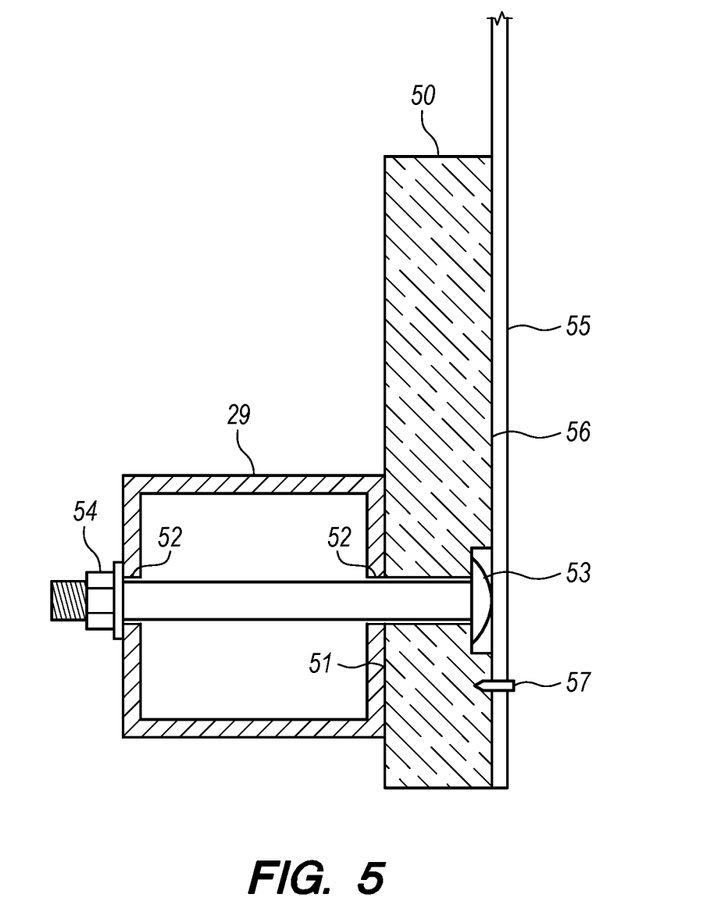
FIG. 5 is a cross-sectional side view of wood boards secured to a front face of the paint frame.

FIG. 5 is a cross-sectional side view of a wood board 50 secured to a front face 51 of one of the frame branches 29 of the paint frame. The frame branch 29 shown, like all of the other frame branches that form the rectangular perimeter of the paint frame, includes lateral holes 52 for mounting a wood board 50. For example, suitable wood boards of any desired thickness and width may be bolted to the perimeter of the paint frame with carriage bolts 53. Ideally, the carriage bolts 53 are inserted through the wood board 50 and through the front face 51 of the frame branch, to the back face of the frame branch, such that the nut 54 and threaded end of the bolt 53 do not interfere with the fabric 55 that is subsequently secured in position along the exposed front face 56 of the wood board 50. The fabric 55 may be secured to the wood board 50 using staples 57.

Figure 6:
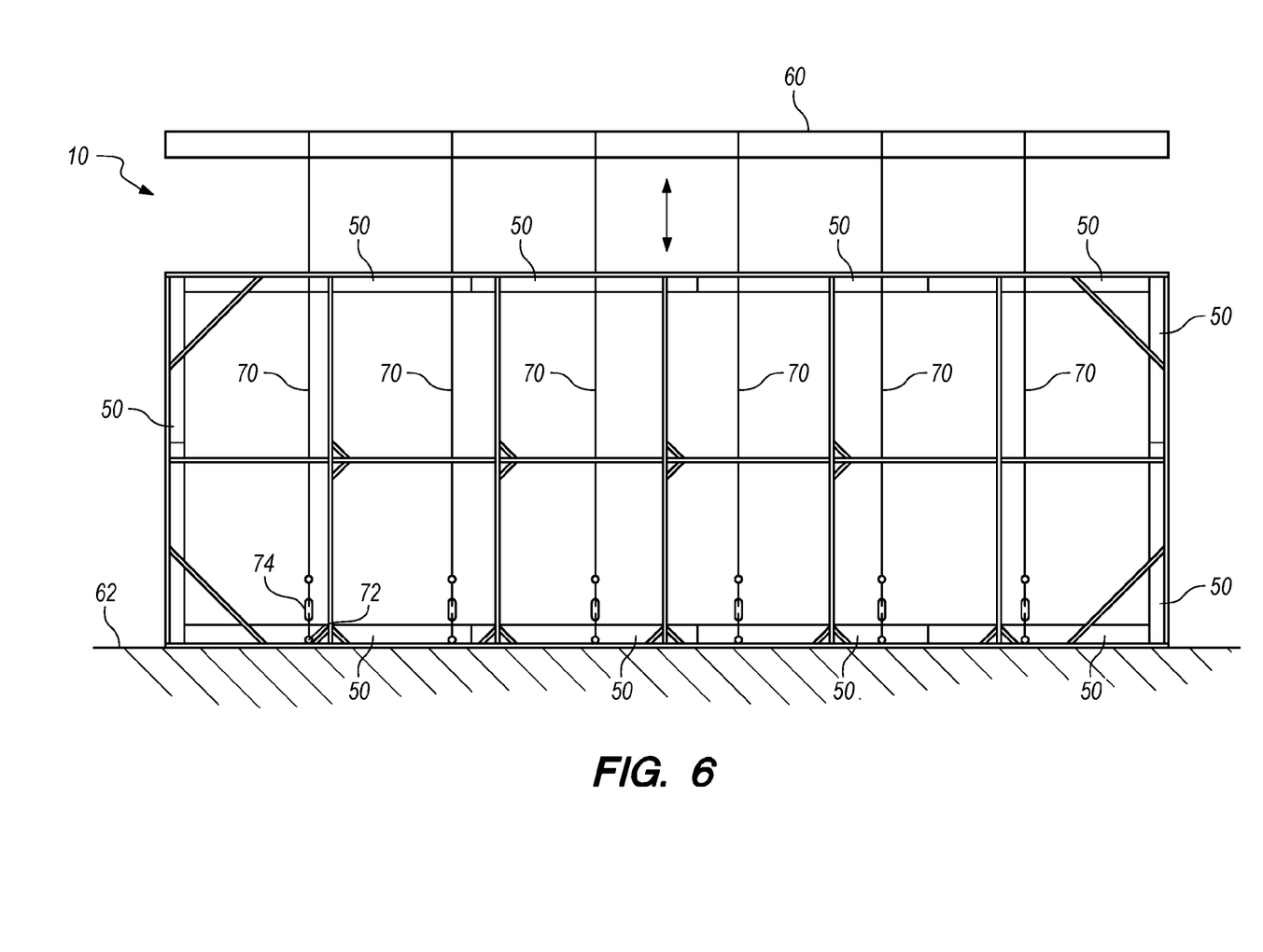
FIG. 6 is a back view of the paint frame after securing wood boards to a perimeter of the paint frame.

FIG. 6 is a back view of the paint frame 10 after securing wood boards 50 to the front face along the rectangular perimeter of the paint frame. Each board 50 is independently secured to the paint frame in at least two positions along the length of the board, but a particular board may be secured to one frame segment or more than one frame segment. Individual boards may be replaced as needed.

In one option, a plurality of wire ropes 70 may be used to support the paint frame from the lower edge of the paint frame 10. Each independent wire rope 70 may have a first end secured to the lower edge of the paint frame and a second end secured to an overhead batten 60 above the state floor 62, thereby allowing the paint frame 10 to be flown in (down) and out (up) as needed. In this example, an eye bolt 72 is secured through the lower frame branches. A first end of a turnbuckle 74 is then secured to the eye bolt 72, and a second end of the turn buckle 74 is coupled to the first end of the wire rope 70. Accordingly, the turn buckle 74 may be used for leveling or otherwise adjusting how the paint frame hangs from the batten 60. The wire rope 70 then extends through a small hole in each of the aligned frame branches, such that the paint frame remains vertical.

Figure 7A:
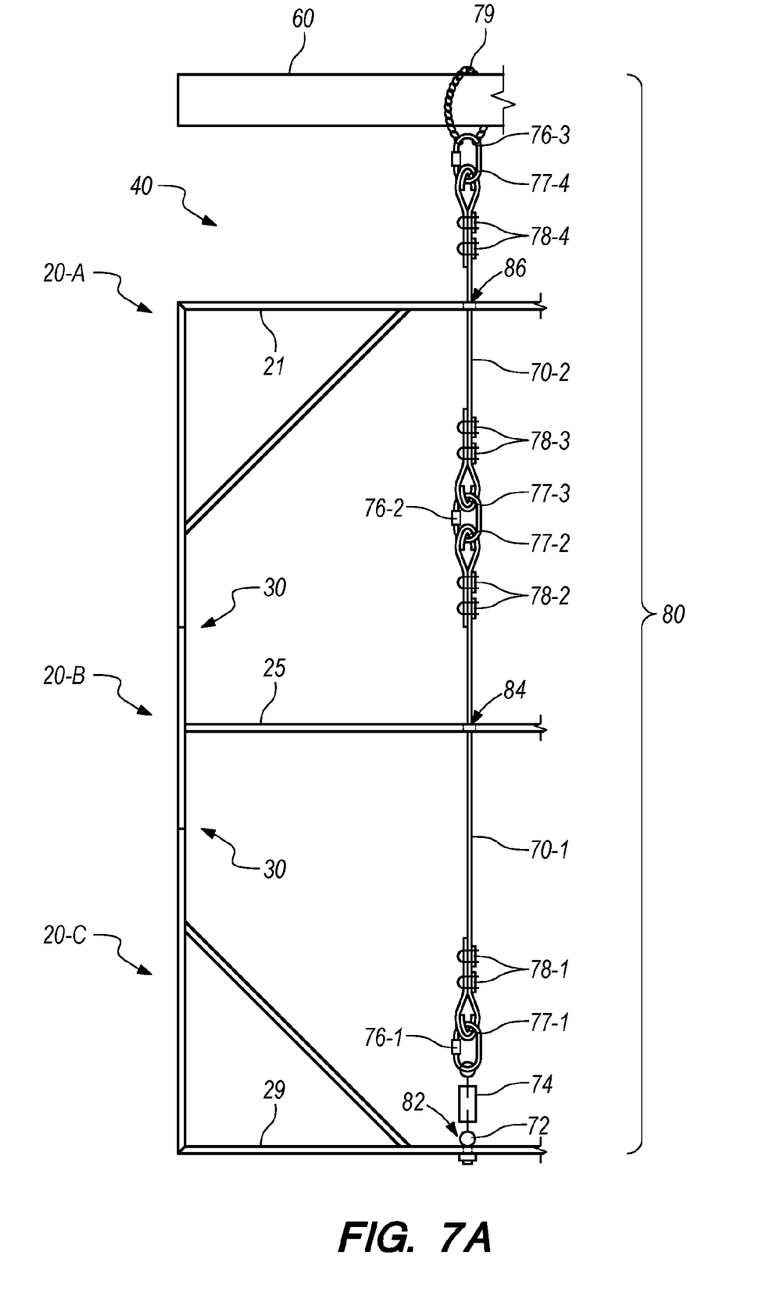
FIG. 7A is a schematic diagram of a frame subassembly including a wire rope assembly.

FIG. 7A is a schematic diagram of the first frame subassembly 40 including a wire rope assembly 80. The wire rope assembly 80 illustrates one example of the hardware that may be included in the wire rope 70 shown in FIG. 6, but also illustrates the use of optional shackles 76-1, 76-2, 76-3 that allows the wire rope assembly 80 to be separated in a manner that facilitates reuse of the assembly. Specifically, the wire rope assembly 80 may be easily disassembled and reassembled. Furthermore, the wire rope assembly 80 facilitates the disassembly of the frame segments 20-A, 20-B, 20-C without damaging the components of the wire rope assembly and without requiring their replacement during a subsequent use of the paint frame. Only a portion of the paint frame 10 (see FIG. 6) is shown in FIG. 7A, but it should be understood that the wire rope assembly 80 may be duplicated for use across multiple subassemblies or portions of the paint frame in order to adequately support the paint frame from flying equipment that may be available within an auditorium.

In the embodiment shown, the weight of the paint frame is supported from the lower edge of the paint frame. The wire rope assembly 80 will be described from the bottom up. An eye bolt 72 is secured through the frame branch 29 of the lower frame segment 20-C leaving an upwardly extending eye for attachment with a turnbuckle 74. A shackle 76-1 releasably couples the turnbuckle 74 to wire rope section 70-1. Specifically, the wire rope section 70-1 has a lower distal end wrapped over a turnaround 77-1 and fastened back to itself using wire clips 78-1. An upper distal end of the wire rope section 70-1 is similarly constructed with the turnaround 77-2 and wire clips 78-2. Furthermore, a second wire rope section 70-2 may be constructed in the same manner as the wire rope section 70-1, and the two wire rope sections may be releasably coupled with a shackle 76-2. A chain 79 may be looped around the batten 60 with the ends of the chain 79 releasably coupled to an upper distal end of the wire rope section 70-2 using a shackle 76-3. Notice that the eye bolt 72 passes through a small vertical hole 82 in the frame branch 29, the wire rope section 70-1 passes through a small vertical hole 84 in the frame branch 25, and the wire rope section 70-2 passes through a small vertical hole 86 in the frame branch 21. The holes 82, 84, 86 are preferably vertically aligned.

Figure 7B:
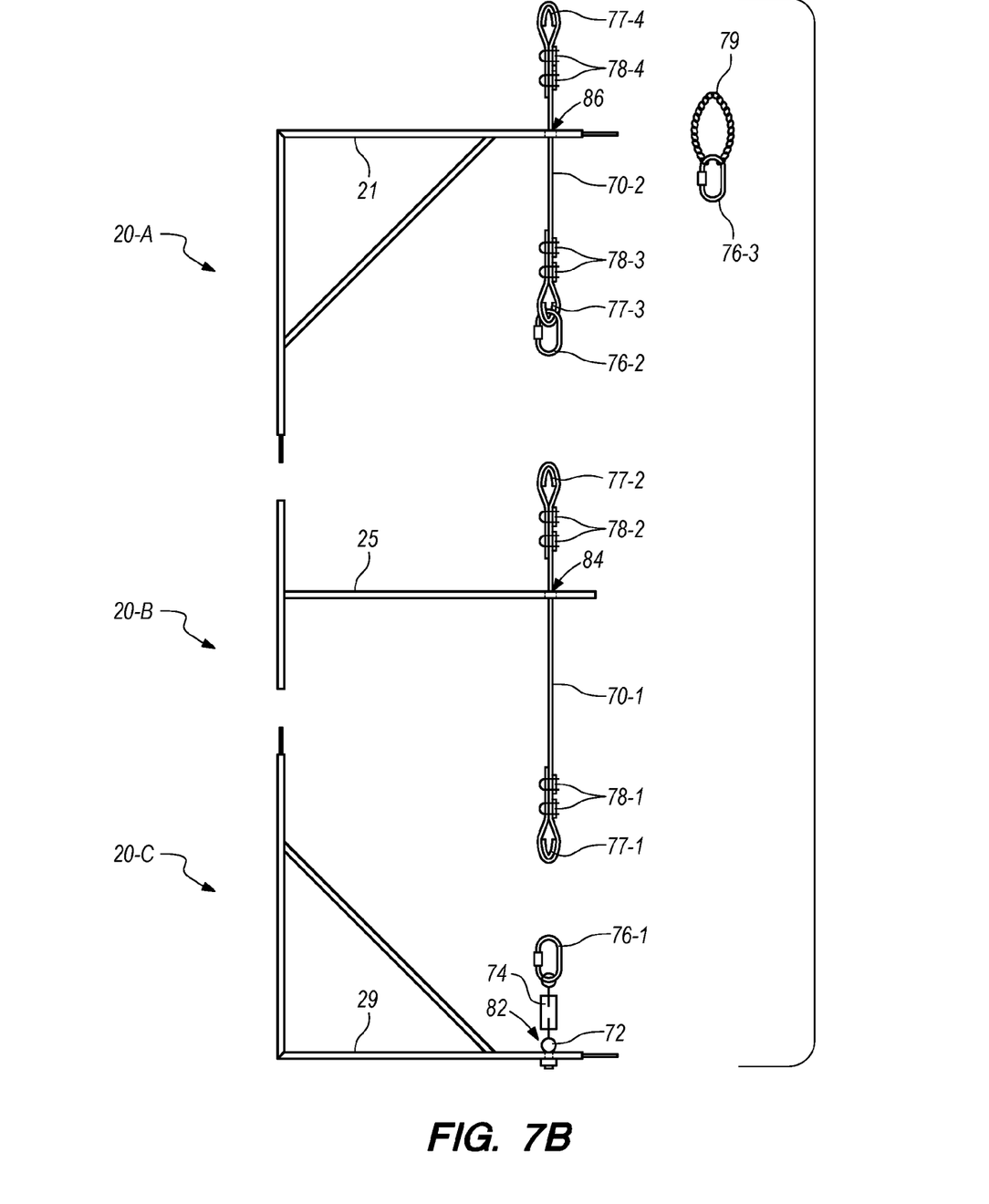
FIG. 7B is a schematic diagram of three frame segments and wire rope of the frame subassembly of FIG. 7A after disassembly.

FIG. 7B is a schematic diagram of the frame segments 20-A, 20-B, and 20-C after disassembly. The shackles 76-1, 76-2, 76-3 shown in FIG. 7A have been released (and reattached merely to avoid misplacing them), such that the wire rope assembly is now also disassembled. Specifically, the eye bolt 72, turnbuckle 74 and shackle 76-1 remain attached to the frame segment 20-C, the entire wire rope section 70-1 remains attached to the frame segment 20-B, and the entire wire rope section 70-2 (along with shackle 76-2) remains attached to the frame segment 20-A, while the chain 79 and shackle 76-3 have been completely separated. Being separated in this or a similar manner, the hardware components and wire rope sections of the wire rope assembly 80 (see FIG. 7A) facilitate the storage of the frame segments 20-A, 20-B, and 20-C without removing any wire clips. Upon reassembly of the paint frame, the frame segments 20-A, 20-B, and 20-C may be connected as previously described, and the shackles 76-1, 76-2, 76-3 may be reconnected between adjacent components to reassembly the wire rope assembly 80 as shown in FIG. 7A.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A paint frame, comprising:
    a plurality of frame segments, each frame segment having a plurality of frame branches, and each frame branch of each frame segment having a distal end releasably connected to the distal end of one of the frame branches of an adjacent frame segment, wherein the frame branches of the plurality of frame segments are connected to form a rectangular grid having a perimeter edge with a planar front surface; and
    a plurality of wire rope assemblies, each wire rope assembly supporting the rectangular grid from a bottom portion of the perimeter edge and extending through vertically aligned holes in the frame branches.

2. The paint frame of claim 1, wherein each frame segment includes at least a first frame branch and a second frame branch that is perpendicular to the first frame branch.

3. The paint frame of claim 2, wherein the plurality of frame segments includes corner segments, side segments and interior segments, wherein each of the corner segments have two frame branches, each of the side segments have three frame branches, and each of the interior segments have four frame branches.

4. The paint frame of claim 1, wherein the rectangular grid includes at least two rows of grid blocks and at least three columns of grid blocks.

5. The paint frame of claim 1, wherein the frame branches that form the perimeter edge of the rectangular grid include a plurality of spaced apart holes extending through the frame branches from the planar front surface, wherein the holes receive fasteners securing wood boards along the planar front surface, and wherein the wood boards form a rectangular frame to which fabric may be secured using staples.

6. The paint frame of claim 1, wherein each of the frame branches are made with square metal tubing.

7. The paint frame of claim 6, wherein each of the frame branches have the same diameter.

8. The paint frame of claim 7, wherein the distal ends of first and second connected frame branches receive and secure first and second opposing ends of a single section of square metal tubing.

9. The paint frame of claim 8, wherein the first opposing end of the single section of square metal tubing is welded into the distal end of the first connected frame branch, and wherein the second opposing end of the single section of square metal tubing is releasably secured into the distal end of the second connected frame branch.

10. The paint frame of claim 9, wherein the second opposing end of the single section of square metal tubing is releasably secured into the distal end of the second connected frame branch by securing a removable fastener in a first hole through the distal end of the second connected frame branch and a second hole through the second opposing end of the single section of square metal tubing.

11. The paint frame of claim 8, wherein the distal ends of the first and second connected frame branches each form a shoulder that is perpendicular to an axial centerline of the frame branch, and wherein the shoulder of the first connected frame branch engages the shoulder of the second connected frame branch.

12. The paint frame of claim 10, wherein the removable fastener extends parallel to the planar front surface.

13. The paint frame of claim 1, wherein the plurality of wire rope assemblies suspends the rectangular grid from a fly system.

14. The paint frame of claim 1, wherein each wire rope assembly includes a plurality of wire rope sections, each wire rope section extending through a single frame branch and releasably connected to adjacent portions of the wire rope assembly.

15. A kit for assembling a paint frame, comprising:
    a plurality of frame segments, each frame segment having a plurality of frame branches, and each frame branch of each frame segment having a distal end releasably connectable to the distal end of one of the frame branches of an adjacent frame segment, wherein the frame branches of the plurality of frame segments are releasably connectable to form a rectangular grid having a perimeter edge with a planar front surface, and wherein the rectangular grid includes at least two rows of grid blocks and at least three columns of grid blocks; and
    a plurality of wire rope assemblies, each wire rope assembly connectable to support the rectangular grid from a bottom portion of the perimeter edge and extend through vertically aligned holes in the frame branches.

16. The kit of claim 15, wherein each of the frame branches are made with square metal tubing having the same diameter.

17. The paint frame of claim 1, wherein each wire rope assembly includes a first wire rope section extending through a first hole in a first frame branch and a second wire rope section extending through a second hole in a second frame branch, wherein the first and second holes are vertically aligned with a connector secured to a third frame branch included in the bottom portion of the perimeter edge of the rectangular grid.

18. The paint frame of claim 17, wherein the first and second wire rope sections each have first and second ends securing a turnaround, and wherein the turnaround of the first wire rope section is releasably connectable to the turnaround of the second wire rope section with a shackle.

19. The paint frame of claim 18, wherein each wire rope assembly further includes a turnbuckle.

20. The paint frame of claim 18, wherein the turnarounds are too large to pass through the holes in the frame branches such that the first wire rope section remains attached to the first frame branch upon disassembly of the frame segments and such that the second wire rope section remains attached to the second frame branch upon disassembly of the frame segments.

* * * * *